Patented Dec. 30, 1941

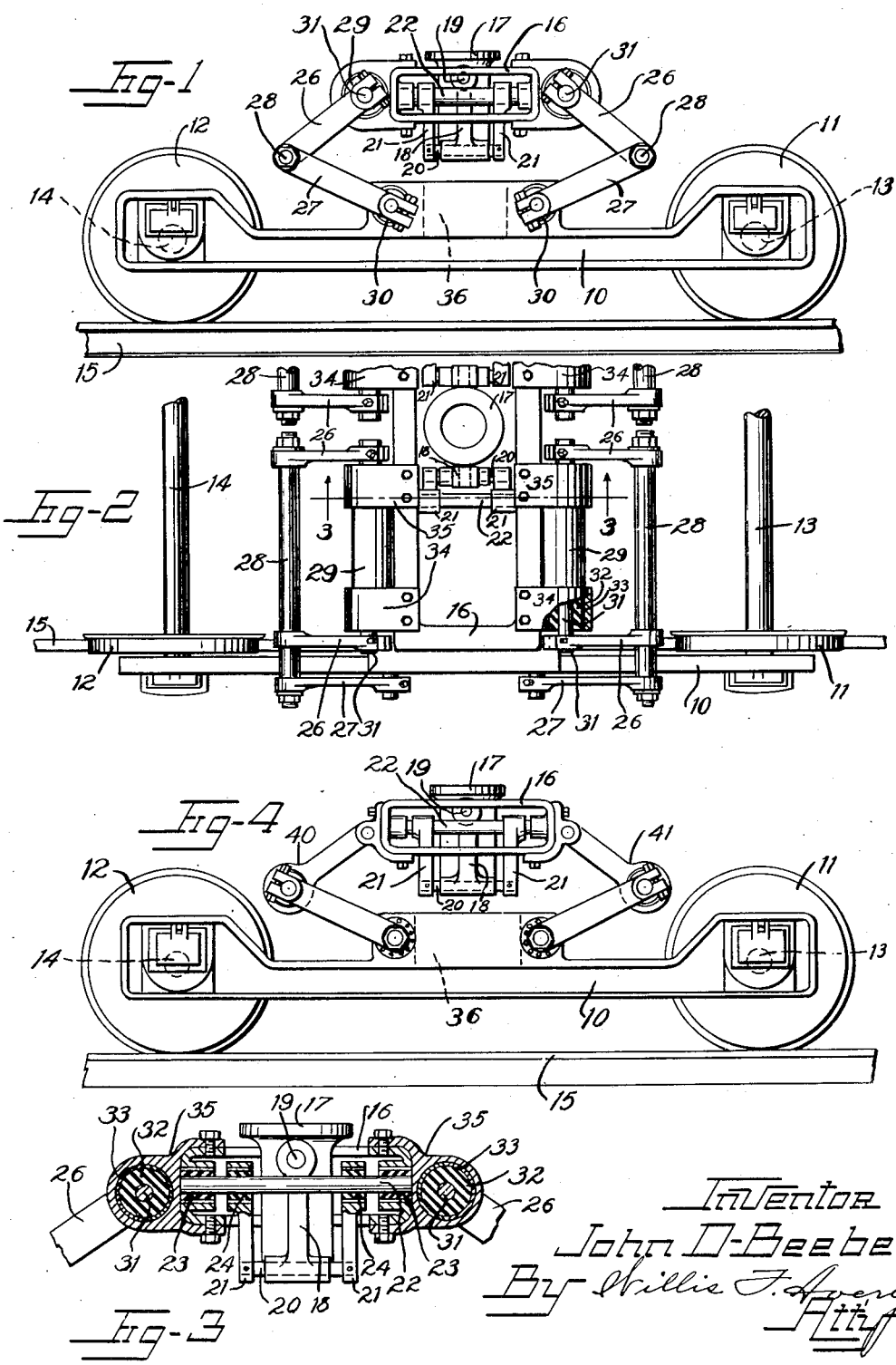

2,268,439

UNITED STATES PATENT OFFICE 2,268,439

VEHICLE SUSPENSION

John D. Beebe, Silver Lake, Ohio, assignor to The B. F. Goodrich Company, New York, N. Y., a corporation of New York Application October 7, 1937, Serial No. 167,767

12 Claims. (Cl. 105—197)

This invention relates to vehicle suspensions and is suitable especially for railway vehicles although many of its features are applicable also to suspensions for other vehicles such, for example, as motor trucks, buses and passenger automobiles.

In railway vehicle suspensions heretofore the springs have been stiff and heavy, usually of the compression type, constructed and arranged to support heavy loads and to provide adequate lateral stability with, however, a sacrifice in the total amount of available deflection and with a lack in many cases of a satisfactory softness in the riding qualities of the suspension.

The chief objects of the present invention are to provide an improved vehicle suspension, to provide an improved suspension suitable especially for railway vehicles, to provide for a large amplitude of cushioning movement, to provide softness in the riding qualities, to provide improved lateral stability, to provide for effectively cushioning impact shocks, and to provide sturdiness and simplicity of structure.

These and further objects will be apparent from the following description, reference being had to the accompanying drawing in which:

Fig. 1 is a side elevation of a railway truck frame and suspension constructed according to and embodying the invention.

Fig. 2 is a plan view of the structure of Fig. 1, with parts broken away and sectioned.

Fig. 3 is a section of a modified form of the invention taken along the line 3—3 of Fig. 2.

Fig. 4 is a view like Fig. 1 but showing a further modified form of construction.

The invention includes among other things a railway suspension comprising rubber bushings mounted to transmit supported load by torsional stress on the rubber, the bushings preferably being mounted in the pivots of a linkage connection in which the links are pivoted in series between the wheel assembly and the supported structure.

Referring to the embodiment illustrated in Fig. 1, a wheel assembly comprising a truck frame 10 and wheels 11 and 12 with through-axles 13 and 14 arranged for travelling upon rails 15 is shown. A bolster 16, which as seen from above in Fig. 2 and from the side as in Fig. 1 is in the form of a hollow rectangular frame, has mounted upon it a center plate 17, the mounting preferably being effected by means of a swing-hanger linkage in which two side links 18, 18 are pivoted at their upper ends to studs 19, 19 on a downwardly extending portion of the center plate 17 so that the latter may swing about a horizontal transverse axis at 19. At their lower ends the links 18, 18 are pivoted on horizontal fore and aft axes upon two rods 20, 20, these rods being mounted in the lower ends of four vertically extending straps 21, 21 mounted at their upper ends upon two pivot rods 22, 22 extending fore and aft, which rods are mounted at their front and rear ends in a bolster frame 16. This provides a universal swinging movement of the center plate in the bolster.

If desired, as shown in Fig. 3, rubber bushings 23, 23 and 24, 24, may be interposed between rods 22, 22 at their connections with the bolster frame 19 and at their connections with the straps 21, 21. Each of these rubber bushings may comprise an annular body of rubber mounted upon a rod 22 and preferably adhered thereto by vulcanization. At the outer surface of the rubber body may be provided a circumferentially discontinuous metallic sleeve structure so that the bushing may be inserted in an eye of the surrounding part with the sleeve structure and rubber held radially compressed toward the end element 22. Side to side swinging movement of the center plate 17 will be resisted resiliently by torsional stress of these rubber bushings so that such movement will be cushioned and the dampening of such movement will be assisted somewhat by hysteresis energy loss in the rubber.

The bolster 16 is supported at its four corners upon the truck frame 10 in vertically spaced relation thereto by four linkage assemblies, each comprising a pair of upper links 26, 26 and at least one lower link 27. The upper links 26, 26 are pivoted to the bolster and the lower links 27, 27 are pivoted to the truck frame, and the links 26, 27 are pivoted to each other by means of a rod 28 which may extend only part way across the truck frame. Load is transmitted resiliently by means of one or more torsion bushings in each linkage assembly at the pivotal connections. Two such rubber bushings are provided in each linkage assembly in the embodiment of Fig. 1 at 29 and 30. These rubber bushings may be of identical construction and a description of the upper one, 29, will suffice.

The link 26 is rigidly connected at the upper end to a rod 31 extending inwardly of the truck frame and constituting the inner element of the rubber bushing assembly. Upon the rod 31 is disposed an annular, cylindrical body of rubber 32 upon which is mounted a metallic sleeve 33, preferably of circumferentially discontinuous form which may be provided by one or more slits throughout the length of the sleeve, so that the bushing may be mounted within supporting brackets 34, 35 which are attached to the bolster, in such relation that the sleeve 33 and the body 32 of rubber are held radially compressed upon the inner element 31 within the brackets 34, 35. Preferably the rubber is adhered both to the sleeve 33 and the rod 31 as by means of vulcanized adhesion, and the sleeve 33 may be keyed in the brackets, so that no slippage of the parts will occur and load will be transmitted from the bolster to the link and supported by torsional stresses on the rubber, the load being divided among the eight bushings of the four linkage assemblies.

The load is thus transmitted resiliently by torsional stress on the rubber bushings and these bushings serve also to cushion the structure under impact shocks in all directions.

By this construction soft springing may be obtained while sustaining heavy loads throughout a large available deflection range, there being required no compression springs or other structure interposed directly between the bolster and the truck frame to limit such movement and at the same time the construction provides good lateral stability. The deflection range may be increased by providing a suitable recess 36 in the truck frame into which the lower-most parts of the bolster assembly may descend.

The embodiment of Fig. 4 is like that of Fig. 1 except that rubber torsion bushings are provided only in the pivots of the links to each other at 40 and 41, which bushings and their manner of mounting may be the same as those described for Fig. 1.

It is preferred, for the sake of sturdiness and stability, to use pairs of upper links and pairs of lower links at each bushing so that the inner element of the bushing will be connected at each of its ends, although in some cases one link at one end of each bushing will be adequate.

The load may be resiliently supported by torsional stress on the rubber bushing whether one or a plurality of bushings are provided in each linkage assembly and whether the bushings are disposed in the pivots of the links where they connect each other, or in the pivots of the links where they connect with the bolster frame, or in the pivots at the truck frame. If desired the load may be divided by the provision of torsion bushings at all the pivots.

Variations may be made without departing from the scope of the invention as it is defined in the following claims.

I claim:

1. A railway vehicle suspension comprising a truck, a bolster, a supporting and guiding linkage connecting said truck and bolster, said linkage comprising sets of links extending outwardly at opposite sides of the bolster and pivoted to said bolster and to said truck and to one another and adapted to accommodate vertical movement of the bolster and truck one with relation to the other by swinging movement of the links, and rubber torsion bushings in at least some of the pivotal connections of the links mounted to support the load by resisting the swinging movement of the links substantially entirely by torsional stress on the rubber.

2. A railway vehicle truck comprising a car-supporting structure including means for mounting the car thereon for relative pivotal movement of the car and structure about a vertical axis, a plurality of wheels fore and aft of said structure, means connecting said wheels and structure including interposed springing means therefor, said connecting means comprising a plurality of pivotally mounted arms extending generally forwardly and rearwardly of said structure, and springing torsion bushings in at least some of the pivotal connections of said arms, said bushings including bodies of resilient rubber-like material mounted to effect substantially all vertical springing of said structure with respect to said wheels by torsional stress on the rubber-like material through up and down movement of said arms.

3. A railway vehicle truck comprising a car-supporting structure including means for mounting the car thereon for relative pivotal movement of the car and structure about a vertical axis, a plurality of wheels fore and aft of said structure, means connecting said wheels and structure including interposed springing means therefor, said connecting means comprising a plurality of pivotally mounted arms extending generally forwardly and rearwardly of said structure, and springing torsion bushings in at least some of the pivotal connections of said arms, said bushings each comprising an inner element and an outer circumferentially discontinuous sleeve with an interposed body of resilient rubber-like material and means holding the discontinuous sleeve and said rubber-like material pressed radially inward toward said inner element to effect substantially all vertical springing of said structure with respect to said wheels by torsional stress on the rubber-like material through up and down movement of said arms.

4. A railway vehicle truck comprising a car body supporting structure including means for mounting the body thereon for relative pivotal movement of the body and structure about a vertical axis, a plurality of wheels fore and aft of said structure, means connecting said wheels and structure including interposed springing means therefor, said connecting means comprising a plurality of hingedly mounted arms extending generally forwardly and rearwardly of said structure, and springing elements in at least some of the hinge connections of said arms, said elements including bodies of resilient rubber-like material mounted to effect substantially all vertical springing of said structure with respect to said wheels by torsional stresses on the rubber-like material through up and down movement of the outer ends of said arms.

5. A railway vehicle truck comprising a car body supporting structure including means for mounting the body thereon for relative pivotal movement of said body and said structure about a vertical axis, a plurality of wheels fore and aft of said structure, means connecting said wheels and said structure including main vehicle springing means and comprising a plurality of arms each hingedly connected to said structure, and springing elements of elastic plastic material by which said arms are connected to said structure, said elements being constructed and arranged to transmit substantially all vertical springing of said structure with respect to said wheels by torsional stresses in said springing elements through arcuate up and down movement of said arms.

6. A railway truck comprising wheels and axles having journal bearings, a center bearing construction, a frame upon which said center bearing construction is mounted, means connecting said frame to said journal bearings comprising hingedly connected arms extending fore and aft from the vicinity of the respective front and rear corners of said frame, substantially cylindrical springing elements of elastic plastic material serving as the means for hingedly connecting said arms and adapted to effect substantially all vertical springing of said frame with respect to said wheels.

7. A railway truck comprising wheels and axles having journal bearings, a center bearing construction, a frame upon which said center bearing construction is mounted, means connecting said frame to said journal bearings comprising arms extending fore and aft from the vicinity of the respective front and rear corners of said frame, a substantially cylindrical mass of rubber-like material hingedly connecting each of said arms to said frame and serving as the sole means for transmitting all relative movements therebetween.

8. A railway truck comprising wheels and axles having journal bearings, a center bearing construction, a frame upon which said center bearing construction is mounted, means connecting said frame to said journal bearings comprising hingedly connected arms extending fore and aft from the vicinity of the respective front and rear corners of said frame, substantially cylindrical springing elements of elastic plastic material serving as the means for hingedly connecting said arms and adapted to effect substantially all vertical springing of said arms with respect to said frame and also to resist all relative horizontal motions therebetween.

9. A railway truck comprising wheels and axles having journal bearings, a center bearing construction, a frame upon which said center bearing construction is mounted, means connecting said frame to said journal bearings comprising hingedly connected arms extending longitudinally of said frame from the vicinity of the respective front and rear corners of said frame, elastic plastic material serving as the means for hingedly connecting said arms and adapted to effect substantially all vertical springing of said arms with respect to said frame by torsional shear stresses.

10. A railway truck comprising wheels and axles having journal bearings, a center bearing construction, a frame upon which said center bearing construction is mounted, means connecting said frame to said journal bearings comprising hingedly connected arms extending fore and aft from the vicinity of the respective front and rear corners of said frame, substantially cylindrical springing elements of elastic plastic material serving as the means for hingedly connecting said arms, said frame being capable of rocking and tilting movements with respect to a plane containing the axes of said axles, said elements of elastic plastic material constituting resilient means through which all forces incident to said tilting and rocking are transmitted from said frame to said wheels.

11. A railway truck comprising wheels and axles having journal bearings, a center bearing construction, a frame unit upon which said center bearing construction is mounted, means connecting said frame unit and said journal bearings comprising a plurality of arms each hingedly connected to said frame unit and extending generally fore and aft of said frame unit, the means for hingedly connecting said arms and frame unit comprising rubber-like elements adapted to resist substantially all vertical movements of said frame unit with respect to said wheels by torsional shear stresses, and additional rubber-like elements between said arms and said journal bearings adapted to resist all relative vertical and horizontal movements between said arms and said journal bearings.

12. A railway truck comprising wheels and axles having journal bearings, a center bearing construction, a swing bolster upon which said center bearing construction is mounted, a frame unit on which said swing bolster is pivotally mounted, means connecting said frame unit and said journal bearings comprising a plurality of arms each hingedly connected to said frame unit and extending generally longitudinally of said frame unit, the means for hingedly connecting said arms and frame unit comprising masses of elastic plastic material adapted to resist substantially all up and down swinging movements of the outer ends of said arms by torsional shear stresses and adapted to resist elastically substantially all relative horizontal movements of said arms with respect to said frame unit, and additional masses of elastic plastic material between the outer ends of said arms and said journal bearings constructed and arranged to allow vertical springing movement of said journal bearings with respect to the outer ends of said arms.

JOHN D. BEEBE.